P. J. CAHILL.
DREDGE TUMBLER.
APPLICATION FILED OCT. 1, 1919.

1,349,408.

Patented Aug. 10, 1920.
2 SHEETS—SHEET 1.

Inventor
Philip J. Cahill.
by Jas. A. Richmond
his Atty.

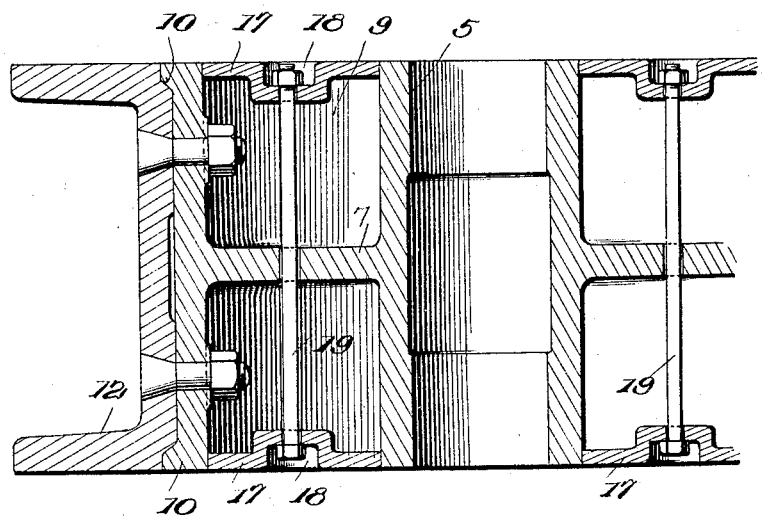
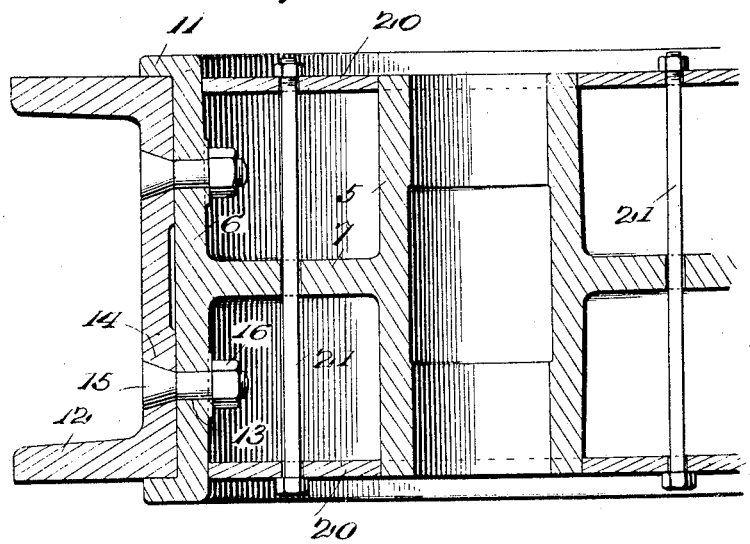

UNITED STATES PATENT OFFICE.

PHILLIP J. CAHILL, OF HIGH BRIDGE, NEW JERSEY, ASSIGNOR TO TAYLOR-WHARTON IRON AND STEEL COMPANY, OF HIGH BRIDGE, NEW JERSEY, A CORPORATION OF NEW JERSEY.

DREDGE-TUMBLER.

1,349,408.      Specification of Letters Patent.      Patented Aug. 10, 1920.

Application filed October 1, 1919. Serial No. 327,822.

*To all whom it may concern:*

Be it known that I, PHILLIP J. CAHILL, a citizen of the United States, residing at High Bridge, in the county of Hunterdon and State of New Jersey, have invented certain new and useful Improvements in Dredge-Tumblers, of which the following is a specification.

Principal objects of the invention are to simplify the general construction of the tumbler; to provide a tumbler whereof the spool member is formed of segments bolted to the drum member; to provide a drum member having marginal rims or seats, which constitute guides for the spool member and prevent the lateral displacement thereof even in the event the bolts or other fastenings should work loose; and to provide a drum member of rugged construction whereof the cheek plates are readily removable to admit of free access to the bolts or other devices for securing the segments in place.

With such and other objects in view, the nature, characteristic features and scope of the invention will more readily be understood from the following description taken in connection with the accompanying drawings, forming a part hereof, wherein—

Fig. 3 is a section on line 3—3 of Fig. 1; and

Fig. 4 is a sectional view of a modification.

Figure 1:
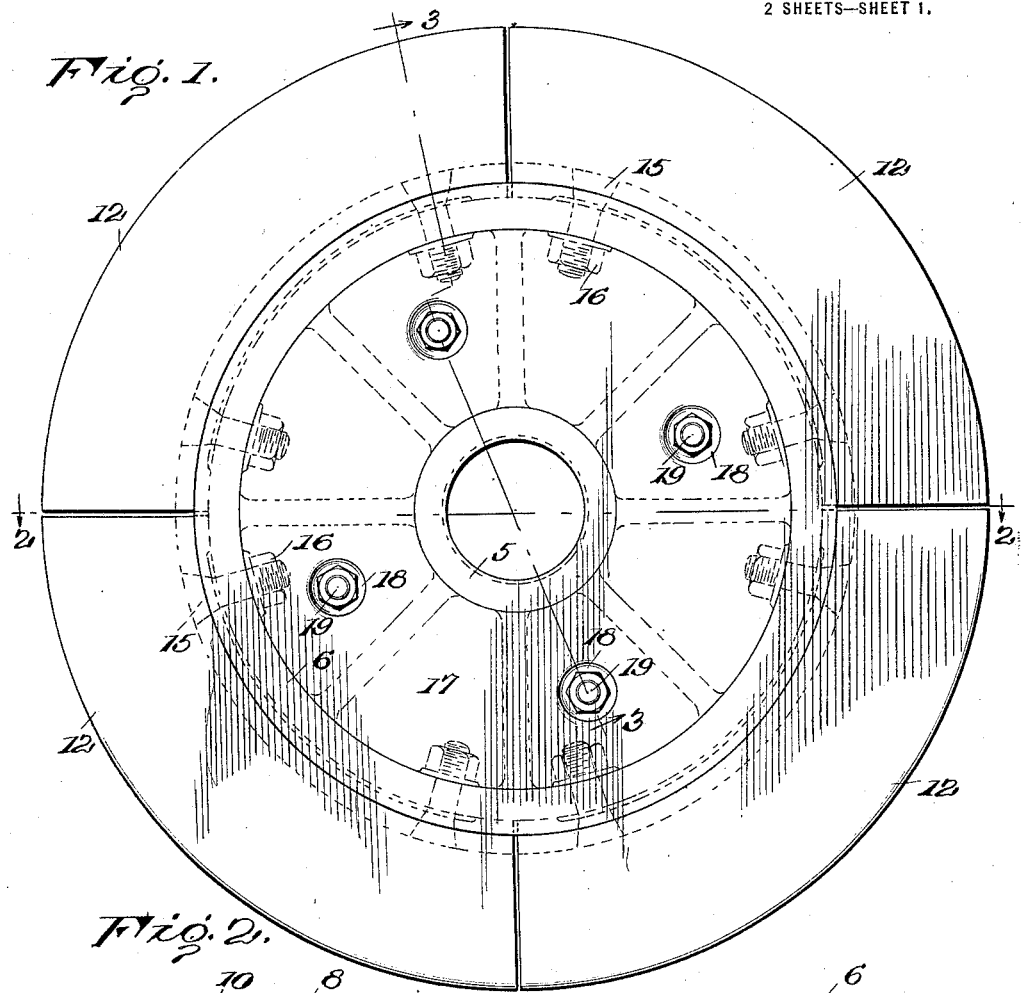
Figure 1 is an end view of a lower tumbler embodying my invention.
Figure 2:
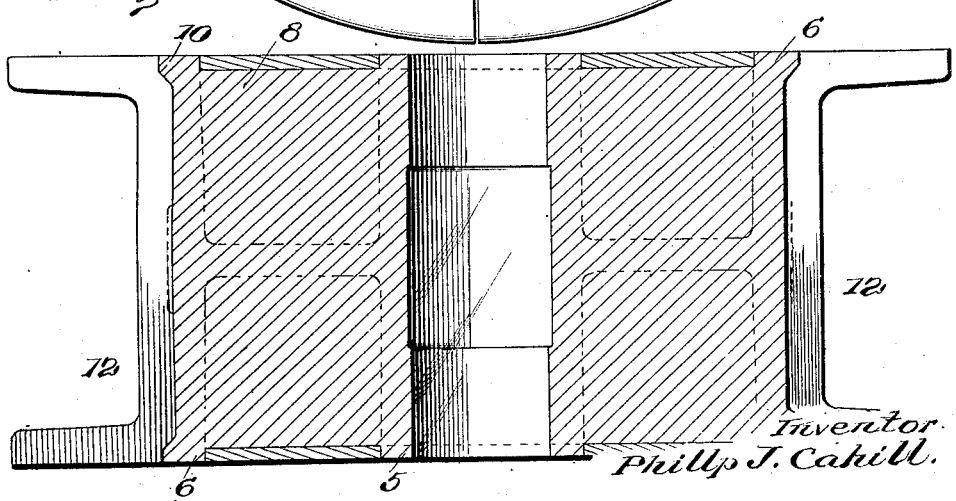
Fig. 2 is a section on line 2—2 of Fig. 1.

The drum section, which may be of carbon steel, has a hub element 5 and a peripheral or spool-carrying element 6, said elements being formed in a single casting and having central webs 7 and endwise ranging webs 8, which form spaces or compartments 9 ultimately closed by cheek plates. The periphery 6 of the drum has marginal guides or stops for the spool or flanged element of the tumbler. These guides may be as indicated in Figs. 2 and 3 wherein 10 represents chamfered annular seats or shoulders, or they may be as indicated in Fig. 4, wherein 11 represents plain rims or flanges.

The spool or flanged member is preferably formed of manganese steel and is cast in segments 12, whereof the number may vary, but usually four in number. The drum has openings 13 over the spaces or compartments 9 and the spool segments have flaring openings 14 registering therewith for the reception of countersunk bolts 15, which are retained by nuts 16. Cheek plates 17 serve to close the ends of the drum and they have a flush joint therewith. The cheek plates have depressions or sockets 18 to house the ends of the through bolts 19. Hence, there are no endwise projecting parts.

In the modification, Fig. 4, the cheek plates 20 are set back sufficiently to prevent the through bolts 21 from projecting beyond the ends of the drum.

Having described my invention, I claim:—

A tumbler comprising a drum having a central web and endwise ranging webs and having marginal rims or seats, a spool consisting of segments confined by said rims and bolted to the drum, and cheek plates closing the ends of the drum.

In testimony whereof I affix my signature.

PHILLIP J. CAHILL.